April 7, 1925.
W. F. YATES ET AL
1,532,359
STRAW SPREADER
Filed Oct. 12, 1922
3 Sheets-Sheet 1
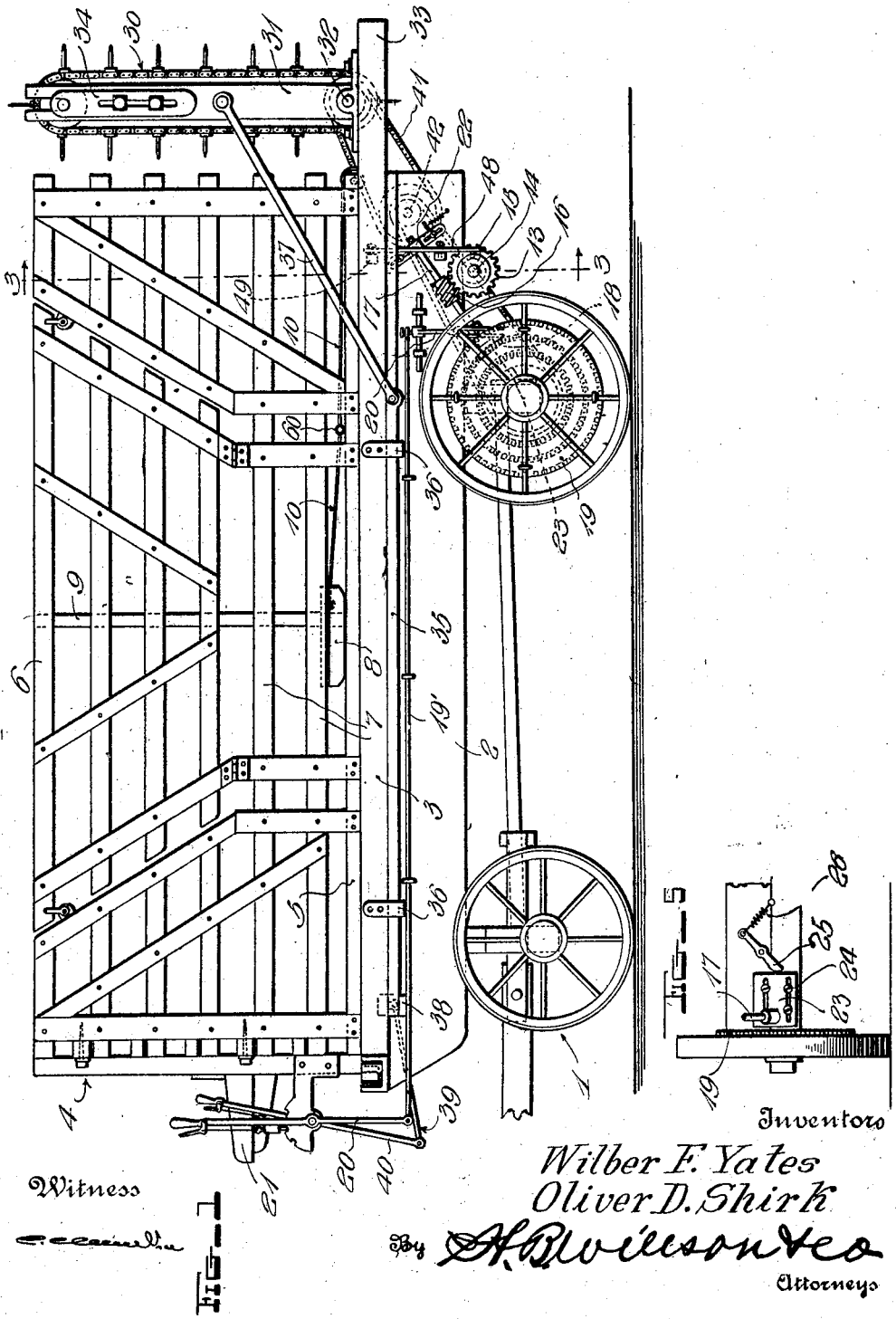
Witness
Inventors
Wilber F. Yates
Oliver D. Shirk
By
Attorneys

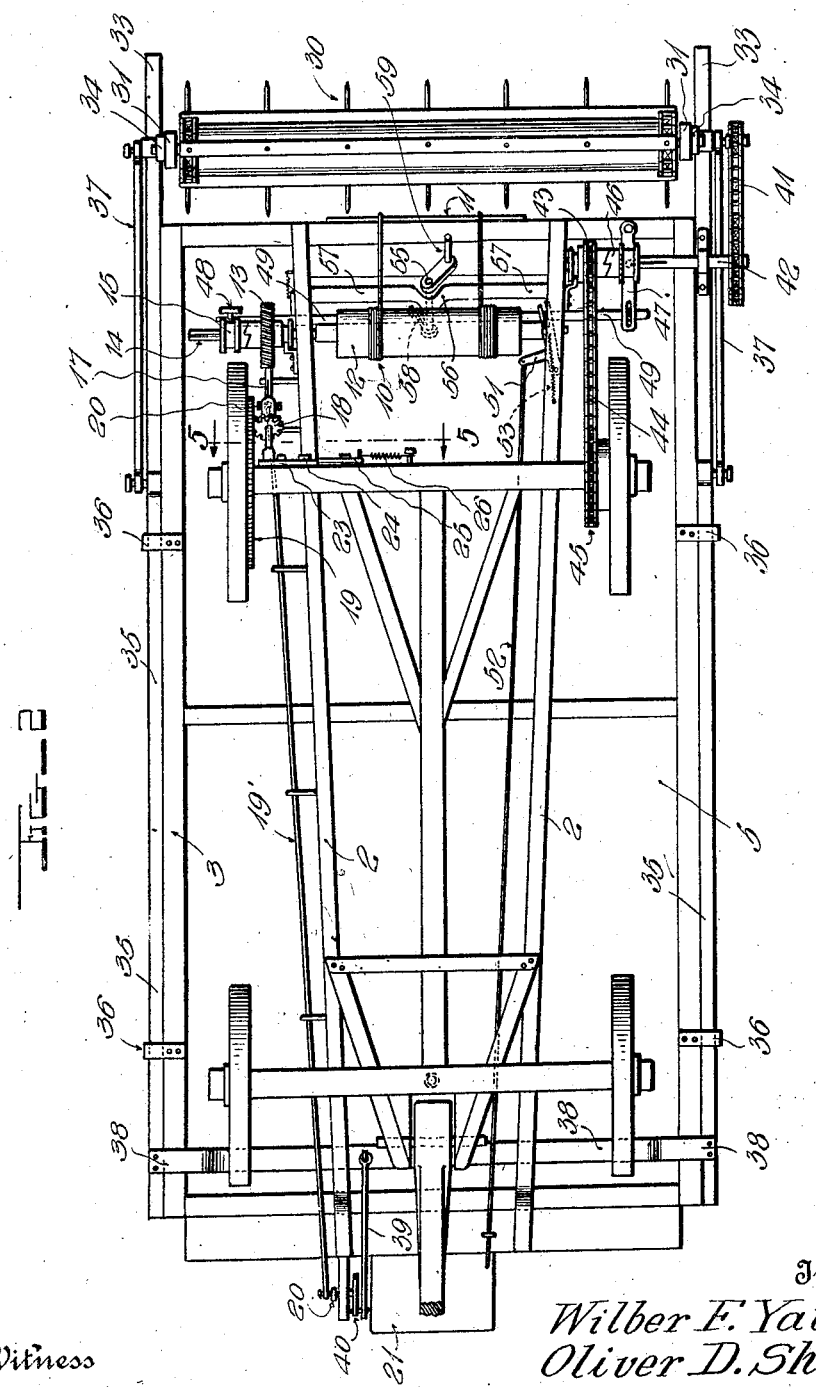

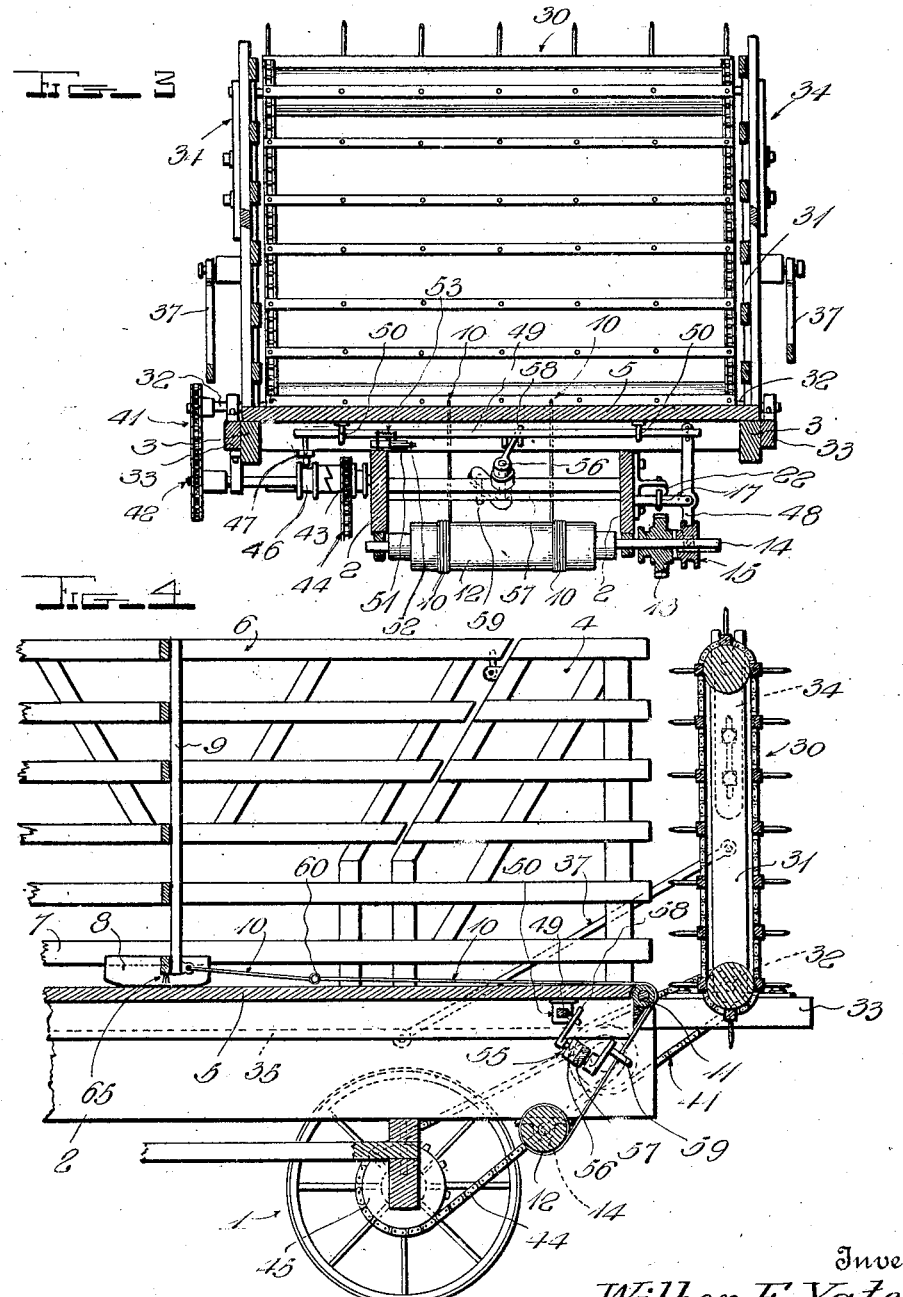

Patented Apr. 7, 1925.

1,532,359

UNITED STATES PATENT OFFICE.

WILBER F. YATES AND OLIVER D. SHIRK, OF LEWISTON, IDAHO.

STRAW SPREADER.

Application filed October 12, 1922. Serial No. 594,044.

*To all whom it may concern:*

Be it known that we, WILBER F. YATES and OLIVER D. SHIRK, citizens of the United States, residing at Lewiston, in the county of Nez Perce and State of Idaho, have invented certain new and useful Improvements in Straw Spreaders; and we do declare the following to be a full, clear, and exact description of the invention, such as will enable others skilled in the art to which it appertains to make and use the same.

Our invention relates to improvements in straw spreaders of the type in which the straw is fed toward the rear end of a straw rack, by a follower, a driven straw distributor being located at the rear end of the rack for raking the straw downwardly onto the ground. In the present machine, the follower is operated by winding a pair of cables or the like upon a drum which is driven from one wheel of the running gear by suitable means including a clutch, and one object of the invention is to provide a novel arrangement of parts for automatically throwing this clutch out when the follower reaches the limit of its rearward travel.

The distributor at the rear end of the rack is driven from another wheel of the running gear by suitable means including a clutch and a further object is to provide means for throwing this clutch out when the clutch of the follower operating means is disengaged.

The distributor is preferably of endless belt form mounted on a vertical frame which is pivoted on the straw rack to swing forwardly and rearwardly as occasion may require. A further object of the invention is to provide novel means for adjusting this frame forwardly or rearwardly in the desired manner. It is a further object of our invention to provide a sweeping device on the carrier for cleaning the bottom of the rack of all such grain and chaff and depositing it in a grain pan with which the front end of the rack is provided.

In order that the bundles may be easily loaded into the rack, the sides, or at least one side, of said rack is provided with an outwardly movable gate between its ends extending to its upper edge, it being the object of this gate to permit easy loading of the rack without the necessity of throwing the bundles entirely over the sides of the latter.

With the foregoing in view, the invention resides in the novel subject matter hereinafter described and claimed, the description being supplemented by the accompanying drawings.

Figure 1 is a side elevation of a machine constructed in accordance with our invention.

Figure 2 is a bottom plan view.

Figure 3 is a vertical transverse sectional view on line 3—3 of Fig. 1.

Figure 4 is a longitudinal sectional view through the rear end of the machine.

Figure 5 is a detail section as indicated by line 5—5 of Fig. 2.

In the drawings above briefly described, the numeral 1 designates an ordinary wagon running gear upon which a pair of longitudinal sills 2 are secured in any desired manner. These sills support the bed-frame 3 of a comparatively deep straw rack 4, this rack being provided with a solid bottom 5 so as to collect any grain and grain-carrying chaff which may fall through the straw when the rack is loaded. In view of the fact that this rack is used to haul bundles of grain to a threshing machine, we make provision for easily loading the rack, without the necessity of throwing the bundles of grain entirely over the sides. In carrying out this end, we provide each side of the rack or only one side if desired, with a downwardly swinging gate 6 located between the ends of the rack and extending entirely to its upper edge. When this gate is swung downwardly, it is an easy matter to load the rack. In order that bundles of grain may be more readily thrown into the ends of the rack, the ends of the gate 6 and the opening which receives this gate are preferably disposed in upwardly diverging relation as shown clearly in Fig. 1.

The rack is of slatted nature and the lower-most slats 7 thereof serve as guide tracks between which and the bottom 5, a pair of elongated shoes 8 are slidably received. A vertical follower 9 rises from and is rigidly secured to the shoes 8 and a pair of ropes, cables, chains or in fact any desired lines 10, are secured at their front ends to the follower, said lines being trained around a guide roller 11 at the rear end of the rack bottom 5 and then declining forwardly to a transverse drum 12 mounted in appropriate bearings which may well be carried by the sills 2. For driving the drum 12 to wind the lines 10 thereon and thereby pull the follower 9 rearwardly, we preferably employ the construction described below. A worm gear 13 is loose upon one projecting end of the drum shaft 14 and may be operatively secured to said shaft by a sliding clutch member 15. A worm 16 on an inclined shaft 17 meshes with the worm gear 13 and said shaft 17 is provided with a pinion 18 which may be shifted into mesh with any of a number of series of teeth on a bull gear 19 on one wheel of the running gear. The numeral 20 designates an appropriate shifting arm for the pinion 18 which may well be operated by a rod 19' leading forwardly to a hand lever 20' adjacent the driver's seat 21.

The upper end of the shaft 17 is mounted in an appropriate bearing 22 secured to one of the sills 2, while the lower end of said shaft is received in a bearing 23 which, by means of bolts and slots 24 or other desired means, is connected with the running gear of the machine in such a manner that it may move toward and away from the axle end 19. In the present showing, a lever 25 bears at one end against the bearing 23 and is connected at its other end with a coil spring 26. This spring 26 acts upon the lever in such a manner as to yieldably force the bearing 23 outwardly. Thus, the pinion 18 will be held in mesh with the bull gear 19, regardless of any inward and outward movement of the wheel which carries said bull gear.

For carrying the endless form of straw rake or distributor 30 at the rear end of the rack 4, we provide an upright frame 31 which is pivoted at its lower end by means of the shaft 32 to a pair of suitable side bars 33 which are secured to and extend rearwardly from the side bars of the base frame 3. This frame 31 is preferably provided with vertically adjustable bearings 34 by means of which any slack in the distributor 30 may be taken up.

For the purpose of swinging the frame 31 rearwardly as occasion may require, we provide a pair of longitudinally slidable bars 35 held against the lower edges of the bars 33 by appropriate guides 36 and connected with the sides of the frame 31 by rearwardly inclined links 37. The front ends of the bars 35 are rigidly connected by a transverse bar 38 from which a link 39 may well lead to a hand lever 40.

The shaft 32 which drives the distributor 30, is in turn driven by a chain 41 from a transverse shaft 42 mounted at the outer side of one of the sills 2, in appropriate bearings. A sprocket 43 is loose upon this shaft 42 and is driven by a chain 44 from a second bull wheel 45 with which the other rear wheel of the running gear is provided. The numeral 46 designates a sliding clutch member on the shaft 42 for locking the sprocket 43 to said shaft when it is desired to drive the distributor 30. A horizontally swinging lever 47 is associated with the clutch member 46 and a vertically positioned lever 48 is operatively connected with the clutch member 15 above described, these two levers being operatively connected with the opposite ends of an operating rod 49 which extends transversely beneath the bottom 5 and is mounted slidably in appropriate bearings 50. A bell crank 51 fulcrumed on one of the sills 2, is connected with the rod 49 at one end and with a longitudinal operating rod 52 at its other end, whereby said rod 49 may be thrown in either direction to simultaneously engage or disengage both clutch members 15 and 46. A coil spring 53 preferably acts on the bell crank 51 at either side of a dead center position, for the purpose of holding the clutch operating parts when the clutches are in either of their positions.

Novel provision is made for automatically throwing the clutches 15 and 46 out when the follower 9 reaches the limit of its rearward movement. In the present showing, this arrangement of parts includes a forwardly inclined rock shaft 55 mounted in an appropriate bearing 56 carried by a transverse bar 57 which extends between the sills 2 at the rear ends of the latter. One end of this rock shaft is provided with a crank arm 58 operatively connected with the rod 49, while the other end of said rock shaft is provided with a crank 59 located between the lines 10, where these lines pass from the roller 11 to the drum 12. We provide a cross bar 60 which is secured at its ends to the lines 10 adjacent the follower 9 for the purpose of striking the crank 59 when the cables or the like have been wound sufficiently to move the follower 9 to its rearmost position. Thus, the shaft 54 is automatically moved to cause its crank arm 58 to shift the shaft 49 and throw both clutch members 15 and 46 out of engagement, so that rearward movement of the follower is arrested and driving of the distributor 30 is discontinued. This follower may again be moved forwardly by hand or in any other desired manner.

When the follower 9 is at the front end of the rack 4, the latter may be loaded with straw and drawn to the field upon which the straw is to be spread. Then at the proper time, the clutches are thrown into operation so that the lines 10 are wound upon the drum 12 and the follower 9 moves rearwardly to feed the straw toward the distributor 30. In the mean time, this distributor is driven in such a manner as to rake the straw downwardly and discharge the same onto the ground. When the follower 9 reaches the limit of its rearward movement, the rod 60 strikes the crank 59 and throws the entire machine out of gear. In this condition the machine may be loaded with bundles of grain to be carried to a threshing machine, during which operation lowering of the gate 6 permits easy loading and the upwardly diverging sides of the opening normally filled by said gate, allows the bundles to be thrown easily into the ends of the rack. The part 65 shown in Fig. 4, is merely a brush for the platform, constituting no part of the invention covered by the present application.

Since excellent results may be obtained from the details disclosed, they are preferably followed. It is to be understood however that within the scope of the invention as claimed, numerous minor changes may be made.

We claim:

1. A straw spreader comprising a wheeled rack, a distributor mounted at the rear end of said rack, a follower mounted for movement along said rack toward said distributor, driving means for said distributor including a clutch, a drum mounted under the rear end of said rack, driving means for said drum including a clutch, a pair of parallel lines secured at their front ends to said follower and wound at their rear ends on said drum for drawing said follower rearwardly, the rear end of said rack having line-guiding means from which the lines extend to said drum, a transversely slidable horizontal rod mounted under the rear end of said rack and having its ends operatively connected with the above-named clutches respectively, and operating means for said rod, including a member connected with and movable bodily with said lines.

2. A straw spreader comprising a wheeled rack, a follower mounted for movement along said rack, a drum mounted under the rear end of said rack, driving means for said drum including a clutch, a pair of parallel lines secured at their front ends to said follower and wound at their rear ends on said drum for drawing said follower rearwardly, the rear end of said rack having line guiding means from which the lines decline to the drum, an inclined rock shaft mounted under the rack at substantially right angles to the inclined plane in which said lines extend to the drum, said rock shaft having a crank on one end located between the inclined portions of said lines, a cross bar extending between and secured to said lines to strike said crank and turn said rock shaft when the follower reaches the rear end of the rack, a lateral arm on the end of said rock shaft opposite said crank, a rod mounted for sliding transversely of the rack and connected between its ends with said lateral arm, one end of said rod being operatively connected with the aforesaid clutch, a straw distributor mounted at the rear end of the rack, and means for driving said distributor including a clutch connected operatively with the other end of said rod.

3. A straw spreader comprising a rack having line-guiding means at its rear end, a follower mounted for longitudinal movement along said rack, a drum mounted under the rear end of said rack, driving connections for said drum including a clutch, a pair of lines connected with said follower and extending therefrom around said line guiding means to said drum for drawing said follower rearwardly along the rack, a transverse bar secured to and movable bodily with said lines, a rock shaft mounted under the rear end of the rack on an axis substantially at right angles to the plane in which the lines extend from said line-guiding means to said drum, clutch throw-out connections between said rock shaft and the aforesaid clutch, and a crank arm on said rock shaft disposed in the path of the aforesaid transverse bar to be operated by the latter.

In testimony whereof we have hereunto affixed our signatures.

WILBER F. YATES.
OLIVER D. SHIRK.